ves each cylinder having two inlet and# UNITED STATES PATENT OFFICE.

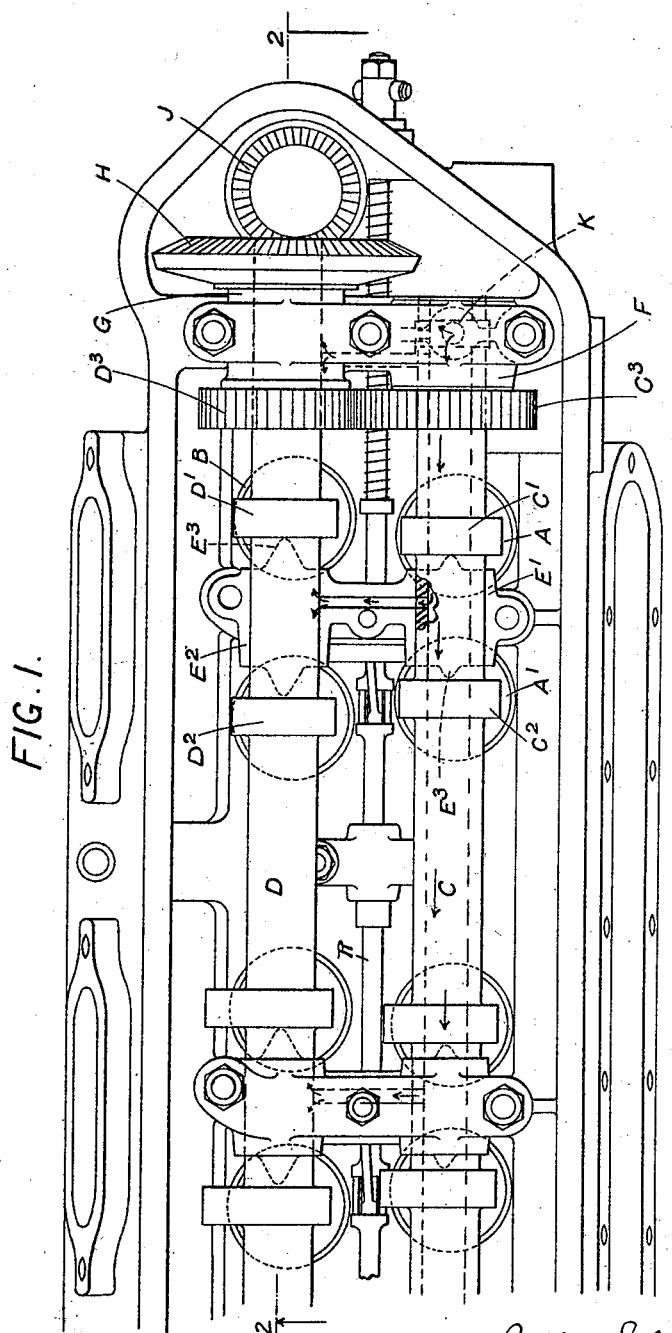

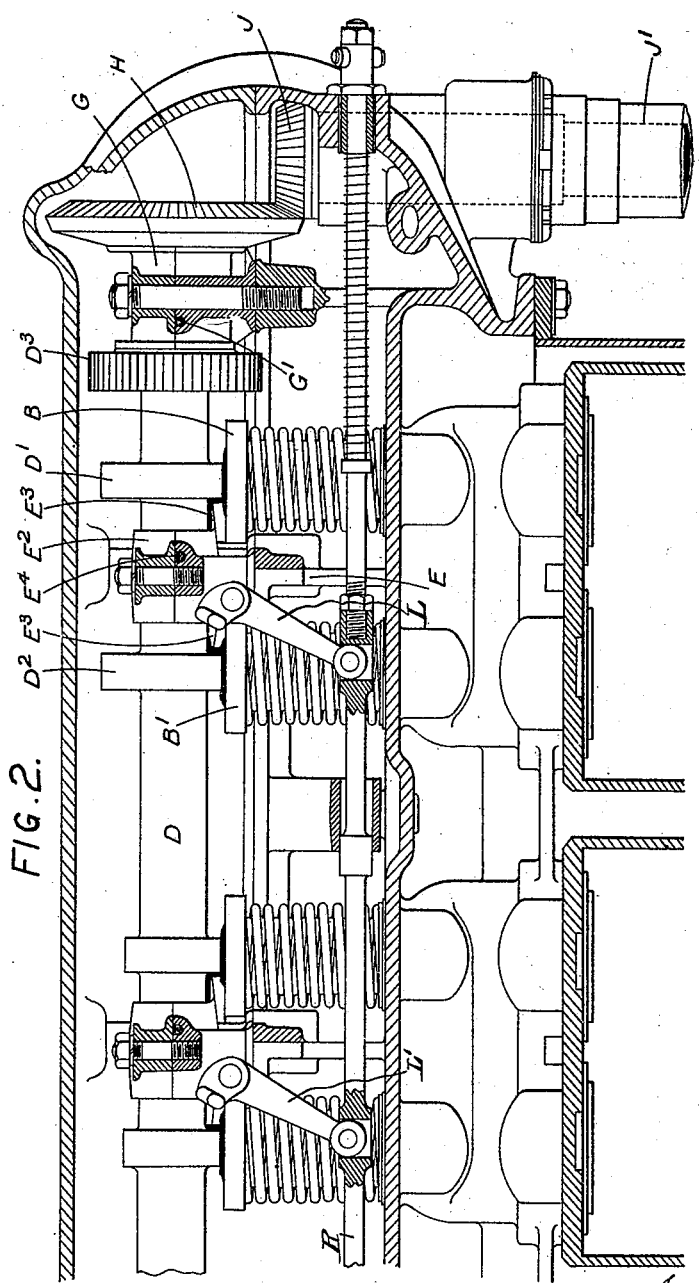

ARTHUR JOHN ROWLEDGE, OF LONDON, ENGLAND, ASSIGNOR TO D. NAPIER & SON LIMITED, OF LONDON, ENGLAND.

VALVE-GEAR FOR INTERNAL-COMBUSTION ENGINES.

1,398,651.

Specification of Letters Patent.   Patented Nov. 29, 1921.

Application filed November 7, 1918.   Serial No. 261,520.

*To all whom it may concern:*

Be it known that I, ARTHUR JOHN ROWLEDGE, subject of the King of England, and residing at London, in England, have invented certain new and useful Improvements in Valve - Gears for Internal - Combustion Engines, of which the following is a specification.

This invention relates to valve gear for internal combustion engines and has for its object to effect certain modifications in existing constructions with a view to bringing about more satisfactory lubrication of the cams and valve tappet disks.

The invention is more particularly applicable to multicylinder internal combustion engines provided with overhead cam shafts. As at present constructed it is usually the practice to supply lubricant to the operative surfaces of the cams through radial passages each leading from the interior of the hollow cam shaft to an orifice in the peripheral part of the cam. With such an arrangement there is a tendency to excess lubrication and consequent wastage of oil. By means of the present improvements the cam shaft is arranged and carried in such a way as to insure that the necessary amount of lubricant passes to the parts in question while avoiding wastage. The improvements also permit of certain desirable modifications in the construction and arrangement of the cam shaft.

According to this invention the faces of the cams on the overhead shaft are lubricated by the excess of oil from the bearings of the cam shaft or shafts which is allowed to flow from the ends of each bearing onto the faces of the adjacent valve tappet disks. Oil is supplied under pressure to the cam shaft bearings from the main lubricating system and as this supply is conveniently arranged to be more than sufficient to meet the actual needs of these bearings the surplus passes on to the tappet disks and supplies the necessary lubricant between these disks and the peripheries of the cams.

By disposing the cam shaft bearings on the cylinder heads instead of between the cylinders as in previous practice it becomes possible to shorten the length of the cam shaft and also to place these bearings nearer to the load inasmuch as in the present improvement each bearing lies adjacent to two cams.

The present improvements may be applied with advantage to internal combustion engines of the type in which each cylinder has four valves operated by two parallel overhead cam shafts, in which case a simpler and lighter construction can be effected. It has been the practice to drive one of these cam shafts from the other through spur gearing, the spur wheels being mounted at or toward the ends of the shafts. In such a construction if the shaft bearings are positioned immediately over the heads of the cylinders in accordance with this invention it becomes possible to dispose the spur wheels at some point in the length of the parallel cam shafts, for example, approximately half-way along these shafts. This enables that shaft bearing to be dispensed with which it has previously been necessary to provide at that end of each cam shaft toward which was carried the spur wheel. In this way a further shortening of the cam shaft can be effected and also a saving in weight.

The present improvements are more particularly applicable to internal combustion engines having overhead cam shafts which are driven through radially disposed intermediate shafts and bevel wheels off the crank shaft in the manner described in the specification of the present inventor's applications for British Letters Patent Nos. 16409 of 1916 and 4200 of 1917.

The detail formation of the bearings and of the cam shafts and the manner in which these bearings are mounted on the cylinders and in which lubricant is supplied thereto may vary as found desirable.

The accompanying drawings illustrate by way of example one method of putting the invention into practice. In these drawings Figure 1 is a plan of two of the cylinders of a multicylinder engine showing the improved arrangement of the cam shafts the casing being removed as also the upper part of one of the bearings for the cam shafts.

Fig. 2 is a vertical sectional elevation on the line 2—2 of Fig. 1 looking in the direction of the arrows.

Like letters indicate like parts throughout the drawings.

The cylinders are provided with overhead valves each cylinder having two inlet and two exhaust valves. Near the end of the cam shaft C is fixed a spur toothed wheel C³ which gears with a similar toothed wheel D³ mounted near the end of the cam shaft D. The end of this cam shaft extends through the bearing G and carries a bevel wheel H which gears with a bevel wheel J on one end of a shaft J' whose other end which is not shown in the drawings is driven by gearing from the engine crank shaft. Thus the cam shaft D is driven through the intermediate shaft J' and bevel gear J and H and the cam shaft C is driven through the gear wheels C³ and D³. As mentioned above in some cases if desired the gear wheels C³ and D³ may be disposed at some point in the lengths of the cam shafts C and D and between two adjacent cylinders.

Oil is delivered to the bearings E' and E² in the following manner. A pipe the opening of which is indicated in dotted lines at K in Fig. 1 delivers oil under pressure to the bearing F in which is a circumferential groove whence the oil passes through holes in the wall of the cam shaft C into the interior of this shaft which is formed hollow. The oil passes out of the cam shaft C through holes in its wall formed in the parts which lie within each bearing E'. As shown in Fig. 2 between the parts of the bearings F and G and the parts of the bearings E' and E² are transverse grooves G' and E⁴ through which oil can travel from the bearing F to the bearing G and from each bearing E' to each adjacent bearing E². As the oil supply to the interior of the cam shaft C is somewhat in excess of the actual requirements of the several bearings of this shaft and of the cam shaft D a certain quantity of oil will escape from the end of each bearing E' and E² and will flow or drip from the lips E³ on to the tappet disks A A' and B B' thereby lubricating the surfaces of these disks on which bear the cams C' C² and D' D².

The lips E³ may be variously formed and arranged or may be dispensed with if the ends of the bearings E' E² are sufficiently extended or shaped to insure delivery of the surplus oil on to the tappet disks. The oil may also be delivered to these bearings in other ways as for instance by a direct supply to each bearing F and G and thence to the interior of each cam shaft D and E. Other details in the structure and arrangement of the parts may be modified as found desirable.

As shown in the drawings, mechanism is provided whereby one inlet and one exhaust valve in each cylinder head may be lifted off its seat so that the cylinders can be filled with explosive mixture for starting purposes, the mixture being ignited when the cylinders have been filled. The reciprocable rod R and the levers L, L' connected thereto constitute a portion of the particular valve lifting mechanism used. It will be understood, however, that mechanism of this character for temporarily lifting the valves is well known in the art and does not constitute a part of the present invention.

What I claim as my invention and desire to secure by Letters Patent is:—

1. In a valve gear for a multicylinder engine, the combination with a series of valves having valve stems and tappet disks, of a cam shaft located above said tappet disks and having a cam operating on each tappet disk, a bearing for the cam shaft located adjacent each tappet disk and arranged to discharge oil upon the same, and means for oiling the bearings.

2. In a valve gear for a multicylinder engine, the combination with a series of valves having valve stems and tappet disks, of a cam shaft located above said tappet disks and having a cam operating on each tappet disk, said tappet disks and cams being arranged in pairs, a bearing for the cam shaft arranged between the individual tappet disks of each pair and arranged to discharge oil on said disks, and means for oiling the bearings.

3. In a valve gear for a multicylinder internal combustion engine the combination of a plurality of valves mounted on the head of each cylinder and each having a tappet disk through which it is operated, two overhead shafts disposed parallel to each other and carrying cams which act on the valve tappet disks, bearings for these shafts which are arranged in pairs each pair of bearings being mounted on the head of a cylinder and in such a position relatively to the cams and to the tappet disks on which they act that oil escaping from the ends of each shaft bearing will pass on to the tappet disks and serve to lubricate the peripheries of the cams, means for delivering oil to the cam shaft bearings, and means for driving the two cam shafts as set forth.

4. In a valve gear for a multicylinder internal combustion engine the combination of a plurality of valves mounted on the head of each cylinder and each having a tappet disk through which it is operated, two overhead shafts disposed parallel to each other one of these shafts being formed hollow, cams so mounted on these shafts as to act on the valve tappet disks, bearings for these shafts which are arranged in pairs each pair of bearings being mounted on the head of a cylinder and in such a position relatively to the cams and to the tappet disks on which they act that oil escaping from the ends of each shaft bearing will pass on to the tappet disks and serve to lubricate the peripheries of the cams, means for delivering oil into the hollow cam shaft, means by which the oil can pass from within this shaft to the bearings of this shaft and thence to the bearings of the other cam shaft, and means for driving the two cam shafts as set forth.

5. In a valve gear for a multicylinder internal combustion engine the combination of a plurality of valves mounted on the head of each cylinder and each having a tappet disk through which it is operated, two overhead shafts disposed parallel to each other and carrying cams which act on the valve tappet disks, bearings for these shafts which are arranged in pairs each pair of bearings being mounted on the head of a cylinder and each bearing being so formed that the ends thereof overhang the faces of the tappet disks adjacent thereto so that oil escaping from the ends of each shaft bearing will pass on to the tappet disks and serve to lubricate the peripheries of the cams which act on these disks, means for delivering oil to the cam shaft bearings, and means for driving the two cam shafts as set forth.

6. In a valve gear for a multicylinder internal combustion engine the combination of a plurality of valves mounted on the head of each cylinder and each having a tappet disk through which it is operated, two overhead shafts disposed parallel to each other one of these shafts being formed hollow, cams so mounted on these shafts as to act on the valve tappet disks, bearings for these shafts which are arranged in pairs each pair of bearings being mounted on the head of a cylinder and each bearing having its ends so shaped as to deliver on to the faces of the adjacent tappet disks the oil that escapes from the ends of the bearing so that this oil will serve to lubricate the peripheries of the cams which act on these disks, means for delivering oil into the hollow cam shaft, means by which the oil can pass from within this shaft to the bearings of this shaft and thence to the bearings of the other cam shaft, gearing between these shafts, and means for driving one of these shafts which drives the other shaft through the gearing as set forth.

In testimony whereof I have signed my name to this specification.

ARTHUR JOHN ROWLEDGE.